(12) United States Patent
Walter

(10) Patent No.: US 10,556,498 B2
(45) Date of Patent: Feb. 11, 2020

(54) CVT DRIVE TRAIN

(71) Applicant: SCHAEFFLER TECHNOLOGIES AG & CO. KG, Herzogenaurach (DE)

(72) Inventor: Bernhard Walter, Oberkirch-Haslach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 325 days.

(21) Appl. No.: 15/112,961

(22) PCT Filed: Dec. 15, 2014

(86) PCT No.: PCT/DE2014/200715
§ 371 (c)(1),
(2) Date: Jul. 20, 2016

(87) PCT Pub. No.: WO2015/110108
PCT Pub. Date: Jul. 30, 2015

(65) Prior Publication Data
US 2016/0347165 A1 Dec. 1, 2016

(30) Foreign Application Priority Data
Jan. 21, 2014 (DE) .......................... 10 2014 201 030

(51) Int. Cl.
*B60K 6/36* (2007.10)
*B60K 6/543* (2007.10)
(Continued)

(52) U.S. Cl.
CPC ................ *B60K 6/543* (2013.01); *B60K 6/36* (2013.01); *F16H 37/022* (2013.01); *F16H 61/04* (2013.01);
(Continued)

(58) Field of Classification Search
CPC .......... F16H 37/021; F16H 2061/0433; F16H 37/022; F16H 2200/2005; B60K 3/36;
(Continued)

(56) References Cited

U.S. PATENT DOCUMENTS 6,306,057 B1 * 10/2001 Morisawa .............. B60K 6/365
475/5
7,717,815 B2 * 5/2010 Tenberge ............... B60K 6/445
180/65.235
(Continued)

FOREIGN PATENT DOCUMENTS

CN 101172459 A 5/2008
CN 101528523 A 9/2009
(Continued)

OTHER PUBLICATIONS

Chinese Office Action for CN201480073632.9; 6 pgs; dated Oct. 9, 2017 by Chinese Patent Office.

*Primary Examiner* — William C Joyce
(74) *Attorney, Agent, or Firm* — Kevin L. Parks

(57) ABSTRACT

A CVT drive train including a continuously adjustable variator and having a transmission input shaft situated on a primary drive side of the drive train and operatively connected with a primary drive source that is an internal combustion engine. A start-up device and a secondary drive source that includes an electrical machine are disposed co-axially. A first additional clutch serves to couple the secondary drive source to a direct drive stage, and a second additional clutch serves to couple the secondary drive to the variator input.

11 Claims, 3 Drawing Sheets

(51) Int. Cl.
  *F16H 61/04* (2006.01)
  *F16H 37/02* (2006.01)
  *B60K 6/365* (2007.10)

(52) U.S. Cl.
  CPC ........... *B60K 6/365* (2013.01); *B60Y 2300/70* (2013.01); *F16H 2061/0433* (2013.01); *F16H 2200/0034* (2013.01); *F16H 2200/2005* (2013.01); *F16H 2200/2033* (2013.01); *Y10S 903/918* (2013.01)

(58) Field of Classification Search
  CPC . B60K 3/387; B60K 6/543; B60K 2006/4825
  USPC .............................. 74/661; 180/65.21; 475/5
  See application file for complete search history.

(56) References Cited

U.S. PATENT DOCUMENTS

| | | | |
|---|---|---|---|
| 9,616,739 B2 * | 4/2017 | Hwang | ................... B60K 6/543 |
| 2008/0236917 A1 | 10/2008 | Abe et al. | |
| 2010/0258367 A1 | 10/2010 | Venturi | |

FOREIGN PATENT DOCUMENTS

| | | | |
|---|---|---|---|
| CN | 102892605 A | | 1/2013 |
| EP | 0 908 343 A2 | | 4/1999 |
| EP | 1 038 722 A1 | | 9/2000 |
| EP | 2 275 706 A1 | | 1/2011 |
| JP | 2007-261346 | * | 10/2007 |
| JP | 2010-261544 | * | 11/2010 |
| JP | 2010261544 A | | 11/2010 |
| JP | 2012 056366 A | | 3/2012 |
| JP | 2012056366 A | | 3/2012 |
| WO | WO 2011/127892 A1 | | 10/2011 |

* cited by examiner

CVT DRIVE TRAIN

CROSS-REFERENCE TO RELATED APPLICATION

This application is the U.S. national phase patent application under 35 U.S.C. § 371 of International Patent Application Serial No. PCT/DE2014/200715, having an international filing date of 15 Dec. 2014, and designating the United States, which claims priority based upon German Patent Application No. DE 10 2014 201 030.6, filed on 21 Jan. 2014, the entire contents of each of which applications are hereby incorporated by reference herein to the same extent as if fully rewritten.

BACKGROUND OF THE INVENTION

Field of the Invention

The present invention relates to a CVT drive train having a continuously adjustable variator, and having a transmission input shaft situated on a primary drive side, to which a start-up device and a secondary drive, in particular an electrical machine constituting a secondary drive, are disposed co-axially. In addition, the present invention relates to a method for operating such a CVT drive train.

Description of the Related Art

From international publication WO 2011/127892 A1 a hybrid vehicle is known, having an electrical machine and a chain-driven, conical-pulley transmission according to the preamble of claim 1. A starting clutch and the electrical machine are situated radially outside of a torque sensor.

From European patent specification EP 0 908 343 B1 a hybrid system is known, having a combustion machine and a motor/generator, as well as a continuously variable transmission in various embodiments.

An object of the present invention is to simplify or to improve the construction and/or operation of a CVT drive train having a continuously adjustable variator, and having a transmission input shaft situated on a primary drive side to which a start-up device and a secondary drive are disposed coaxially.

SUMMARY OF THE INVENTION

The above-noted object is fulfilled by a CVT drive train having a continuously adjustable variator and a transmission input shaft situated on a primary drive side. A start-up device and a secondary drive, in particular an electrical machine constituting the secondary drive, are disposed coaxially. The drive train includes a first additional clutch, which serves for coupling the secondary drive to a direct drive stage, and a second additional clutch, which serves for coupling to a variator input. The start-up device is preferably a starting clutch. The starting clutch is designed, for example, as a multi-plate clutch. The CVT transmission according to the invention offers, among other things, the advantage that the power stream of the secondary drive, independently of the speed of rotation, can be routed parallel to the power stream of the primary drive to driving wheels of a motor vehicle equipped with a CVT drive train. The primary drive is preferably a combustion machine, also referred to as an internal combustion engine. The secondary drive is preferably an electrical machine, for example an electric motor and/or a generator. According to another aspect of the invention, the CVT drive train can be used with a separate variator branch to propel the vehicle or the driving wheels. According to another aspect of the invention, a hybrid battery of a hybrid vehicle equipped with the CVT drive train can be charged using the primary drive by means of the secondary drive, which then operates as a generator when the hybrid vehicle is stationary. According to another aspect of the invention, a braking torque or drag torque is not passed through the variator in recuperation operation.

A preferred exemplary embodiment of the CVT drive train is characterized in that the two additional clutches are situated on a variator input side. That has proven particularly advantageous with a front-transverse configuration. With a longitudinal configuration, it can be advantageous to locate the first additional clutch on a variator output side, while the second additional clutch is located on a variator input side.

Another preferred exemplary embodiment of the CVT drive train is characterized in that the two additional clutches are designed as positive-lock clutches. The two additional clutches can be designed, for example, as jaw clutches.

Another preferred exemplary embodiment of the CVT drive train is characterized in that the start-up device is positioned on the primary drive side between the second additional clutch and a torsional vibration damper. The torsional vibration damper on the primary drive side serves advantageously to decouple from the CVT drive train unwanted torsional vibrations that occur during operation of the primary drive, in particular a combustion machine or internal combustion engine. That prevents unwanted damage to the CVT drive train caused by rotational non-uniformities.

Another preferred exemplary embodiment of the CVT drive train is characterized in that the second additional clutch is positioned radially within the secondary drive. The second additional clutch is advantageously situated together with the starting clutch radially within the secondary drive. At the same time, the second additional clutch is especially advantageously situated overlapping the secondary drive in the axial direction. Especially advantageously, both the starting clutch and the second additional clutch are situated completely overlapping the secondary drive in the axial direction.

Another preferred exemplary embodiment of the CVT drive train is characterized in that a third additional clutch is assigned to a variator output on a power output side. The third additional clutch is preferably also designed as a positive-locked clutch, for example as a jaw clutch. The third additional clutch can be assigned to a sub-transmission that serves to constitute a so-called multi-range CVT transmission. According to another aspect of the invention, the sub-transmission is designed without a rotation reversing device.

Another preferred exemplary embodiment of the CVT drive train is characterized in that the direct drive stage is designed as a changeover gear for a dual-range CVT and/or as a purely electric driving gear. Especially advantageously, the direct-drive stage is designed both as a changeover gear for the dual-range CVT and also as a purely electrical driving gear.

Another preferred exemplary embodiment of the CVT drive train is characterized in that the secondary drive is coupled directly to an auxiliary power take-off. That provides, among other things, the advantage that in a commercial vehicle, for example, an auxiliary unit can be operated by means of the secondary drive when the vehicle is stationary. Alternatively, or additionally, the auxiliary unit can be operated by the primary drive. The auxiliary unit is a pump or a compressor, for example.

In addition, the present invention relates to a method for operating a previously described CVT drive train. In connection with the present invention, CVT refers to a stepless transmission; the letters CVT stand for continuously variable transmission. That can be, for example, a steplessly adjustable, chain-driven conical-pulley transmission.

A preferred exemplary embodiment of the method is characterized in that the secondary drive is used for propulsion by means of the direct drive stage when changing over between operating ranges (low/high) of the multi-range CVT transmission, in order to reduce or eliminate an unwanted interruption of propulsive power. That makes it possible to increase the driving comfort when operating a hybrid vehicle equipped with the CVT drive train.

BRIEF DESCRIPTION OF THE DRAWINGS

Additional advantages, features, and details of the present invention can be seen from the following description, in which various exemplary embodiments are described in detail with reference to the drawings. The drawing figures show the following.

DESCRIPTION OF THE PREFERRED EMBODIMENTS

Figure 1:
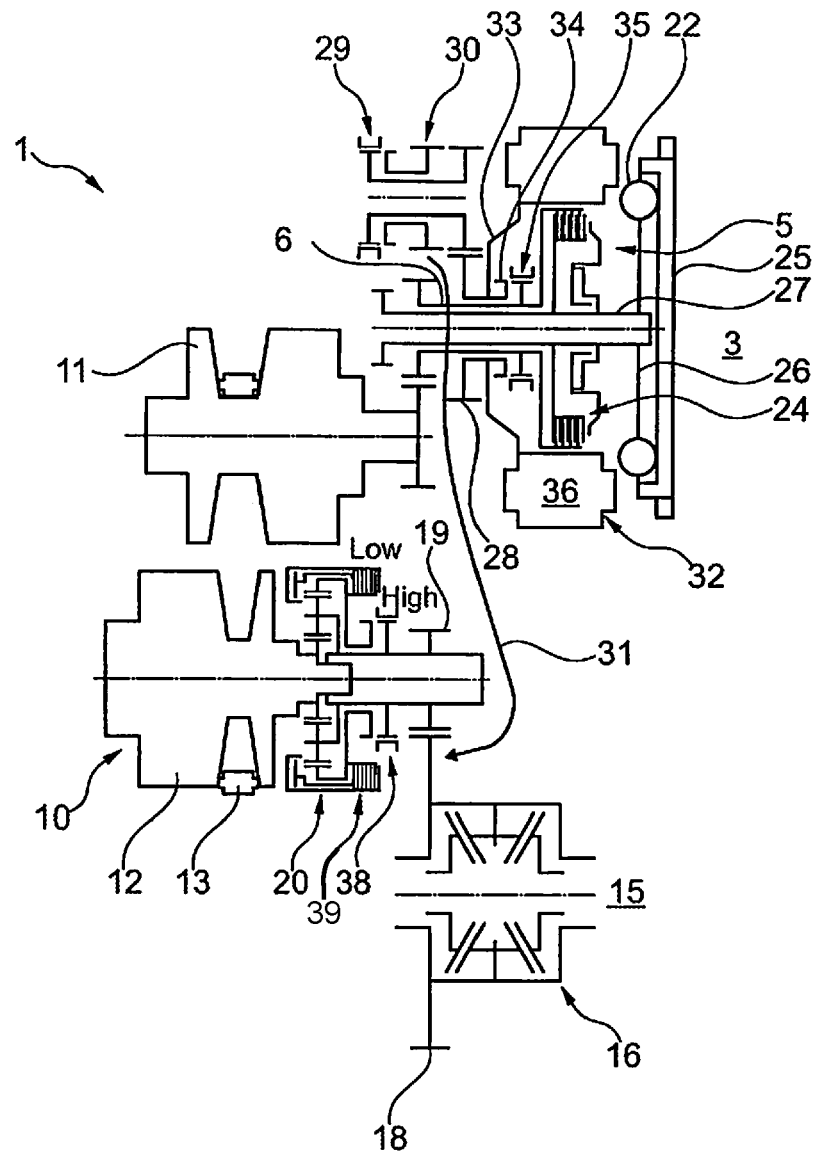
FIG. 1 shows a simplified representation of a CVT drive train according to a first exemplary embodiment, in a front-transverse configuration.
Figure 2:
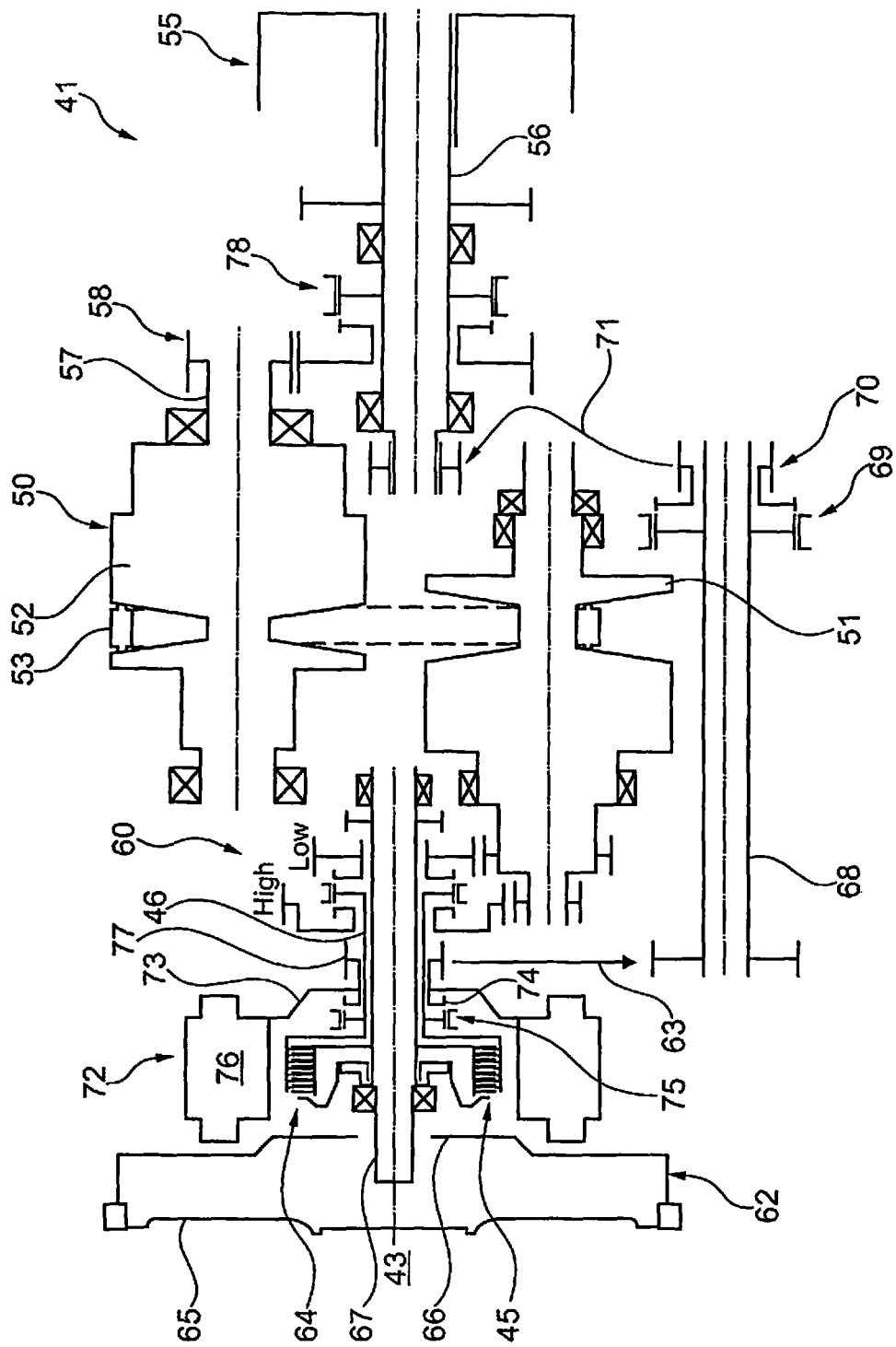
FIG. 2 shows a CVT drive train similar to that shown in FIG. 1, in a longitudinal configuration.

FIGS. 1 and 2 show simplified representations of different exemplary embodiments of a CVT drive train 1; 41 according to the present invention. The following section first examines the common features of the various exemplary embodiments. Following that first section, and occasionally thereafter, the differences between the two exemplary embodiments will be explained.

The CVT drive trains 1; 41 include a primary drive 3; 43, respectively. The primary drive 3; 43 is, for example, a combustion machine, which is also referred to as an internal combustion engine when used in a motor vehicle.

In addition, the CVT drive trains 1; 41 include a secondary drive 32; 72, respectively. A motor vehicle equipped with one of the CVT drive trains 1; 41 and the two drives 3; 43 and 32; 72 is also referred to as a hybrid vehicle. The hybrid vehicle is, for example, a commercial vehicle.

A start-up device 5; 45 makes it possible to set the hybrid vehicle in motion. A torque is forwarded from the primary drive 3, 43 to a start-up output part 6; 46 through the respective start-up device 5; 45. The start-up output part 6; 46 is connected or connectible to a variator input of a variator 10; 50 for propulsion.

The variator 10; 50 includes a conical disk set 11; 51 on the drive side and a conical disk set 12; 52 on the output side. The two conical disk sets 11; 51, 12; 52 are coupled with each other by a respective endless torque-transmitting means 13; 53, each of which is only shown generally. The endless torque-transmitting means 13; 53 is, for example, a special chain.

By means of the two conical disk sets 11; 51 and 12; 52, the transmission ratio between the primary drive 3; 43 and an output drive 15; 55 can be adjusted continuously. The output drive 15; 55 includes at least one driven vehicle wheel (not shown).

Normally, the output drive 15; 55 includes at least two driven vehicle wheels. FIG. 1 shows a differential 16, also referred to as an equalizing transmission, which serves to distribute the provided torque to the two driven vehicle wheels. The differential 16 in FIG. 1 includes a spur gear 18.

The spur gear 18 of the differential 16 meshes with a sub-transmission output gear 19 of a sub-transmission 20. As can be seen in FIG. 1, the sub-transmission 20 is connected to a variator output on the output-side conical disk set 12.

A torsional vibration damper 22; 62 is connected to the primary drive 3; 43 of the CVT drive train 1; 41. The torsional vibration damper 22; 62 is positioned between the primary drive 3; 43 and the start-up device 5; 45. In FIGS. 1 and 2 the start-up device 5; 45 is designed as a starting clutch 24; 64. The starting clutch 24; 64 is a wet running multi-plate clutch.

An input part 25; 65 of the torsional vibration damper 22; 62 is non-rotatably connected to a crankshaft of the primary drive 3; 43. An output part 26; 66 of the torsional vibration damper 22; 62 represents on the one hand an input of the starting clutch 24; 64. On the other hand, the output part 26; 66 of the torsional vibration damper 22; 62 is non-rotatably connected to a transmission input shaft 27; 67. The transmission input shaft 27; 67, with the torsional vibration damper 22; 62 interposed, is thus drivingly connected with the crankshaft of the primary drive 3; 43.

A shifting apparatus 29; 69 of a direct shifting stage or direct drive stage 30; 70 constitutes a first additional clutch of the CVT drive train 1; 41 according to the invention. An arrow 31; 71 indicates that the direct shifting stage 30; 70 serves to bridge the variator 10; 50. The direct shifting stage 30; 70 is connected to the secondary drive 32; 72.

In the CVT drive train shown in FIG. 1, a gear 28 is connected by means of a connecting part 33 to the electrical machine 36 constituting the secondary drive 32. By means of the connecting part 33, the gear 28 and the direct shifting stage or direct drive stage 30, the electrical machine 36, constituting the secondary drive 32, can be connected to the spur gear 18 of the differential 16 directly, that is, bypassing the variator 10, to transmit torque.

Furthermore, a clutch input part 34 of a shifting apparatus 35 is connected by means of the connecting part 33 to the electrical machine 36 which constitutes the secondary drive 32. The shifting apparatus 35 constitutes a second additional clutch. The start-up output part 6 of the starting clutch 24 can be connected by means of the second additional clutch 35 to the electrical machine 36, constituting the secondary drive 32, to transmit torque.

The sub-transmission 20 includes a planetary gear set and a shifting apparatus 39. The shifting apparatus 39 makes it possible to switch between a first range low and a second range high. By means of the shifting apparatus 39, two operating ranges can be provided at the variator output. In that way, the shifting apparatus 39 constitutes a shifting apparatus for switching between a first range low and a second range high at the variator output.

In the CVT drive trains 1 and 41 shown in FIGS. 1 and 2, the electrical machine 36; 76, constituting the secondary drive 32; 72, is positioned concentrically or coaxially to the starting clutch 24; 64, which is also referred to as the main starting clutch. Furthermore, the electrical machine 36; 76 constituting the secondary drive 32; 72 is positioned concentrically or coaxially to the transmission input shaft 27; 67.

The main starting clutch 24; 64 is located radially inside the electrical machine 36; 76. The electrical machine 36; 76 can be connected by means of the first additional clutch 29; 69 and the direct drive stage 30; 70 to the vehicle's driving wheels, or by means of the second additional clutch 35; 75 to the internal combustion engine branch, i.e., to the primary drive 3; 43. That enables a parallel and also mutually independent power stream of the internal combustion engine branch and the electric motor branch to the driving wheels of the hybrid vehicle.

The additional clutches 29, 35; and 69, 75; are preferably designed as cost-effective jaw clutches. Using the additional clutches 29, 35; and 69, 75; the electric motor or electrical machine 36; 76 is able to drive the vehicle's driving wheels simultaneously at different electric motor speeds with optimal efficiency. During recuperation of braking energy, the latter can be conducted to the electric motor 36; 76 by means of the direct stage 30; 70, with no additional load on the variator 10; 50. Additionally, using the electric motor 36; 76, torque can be conducted by means of the direct stage 30; 70 to the vehicle's driving wheels (boosting), without also loading the variator 10; 50.

By positioning the main starting clutch 24; 64 between the second additional clutch 35; 75 and the torsional vibration damper 22; 62 of the primary drive 3; 43, it is possible to use the main starting clutch 24; 64 as a disconnecting clutch for the primary drive 3; 43, for example during recuperation of braking energy from the vehicle's driving wheels. Thus, no additional decoupling clutch is needed.

Positioning the additional clutch 35; 75 radially inside the electrical machine 36; 76 results in especially favorable construction space in the complete transmission assembly.

By means of the third additional clutch 38; 78, which constitutes an output-side decoupling clutch, the variator 10; 50 can be uncoupled on the output side in a simple manner if the vehicle is to be driven by means of the direct drive stage 30; 70 using only the electric motor branch. Together with the drive-side additional clutch 35; 75, the variator 10; 50 can additionally then be brought completely to a stop in order to drive especially economically. If the electrical machine 36; 76 is to be operated as a generator by means of the combustion engine branch when the vehicle is stationary, depending on the configuration, the output-side decoupling clutch 38; 78 after the variator 10; 50 is also necessary or advantageous.

Costs can be saved by dispensing with a rotation reversing device, which would serve to provide a reverse gear. Furthermore, the transmission can be made more space-efficient and lighter. By means of the output-side decoupling clutch 38; 78, which constitutes the third additional clutch, a hybrid battery of the hybrid vehicle can be charged advantageously when the hybrid vehicle is stationary. That is necessary, for example, in emergencies when the hybrid battery has been drained unexpectedly and the vehicle can be driven backwards only electrically.

The CVT drive train 41 shown in FIG. 2 is, for example, the drive train of a commercial vehicle, particularly of a truck. Located on the output side is a transmission output shaft 56. The transmission output shaft 56 is connected to a variator output 57 by means of a gear stage 58. The gear stage 58 is connected by means of the third additional clutch 78 to the transmission input shaft 56 to transmit torque.

In FIG. 2, the sub-transmission 60 is positioned on the input side of the variator 50, in contrast to the CVT drive train 1 shown in FIG. 1. Furthermore, the sub-transmission 60 is designed not as a planetary transmission, but as a fixed-stage transmission. Otherwise, the sub-transmission 60 serves to provide two operating ranges, low and high, as in the case of the CVT drive train shown in FIG. 1.

In FIG. 2, the direct shift stage or direct drive stage 70 is connected by means of a gear 77, and as indicated by means of an arrow 63, by means of an additional shaft 68 to the transmission output shaft 56, as indicated by the arrow 71. The gear 77 is connected by means of the connecting part 73 to the electrical machine 76, which constitutes the secondary drive 72. Otherwise, the direct drive stage 70 functions as in the case of the CVT drive train 1 shown in FIG. 1.

Furthermore, a clutch input part 74 of a shifting apparatus 75 is connected by means of the connecting part 73 to the electrical machine 76 which constitutes the secondary drive 72. The shifting apparatus 75 constitutes the second additional clutch, and functions like the second additional clutch 35 in the CVT drive train shown in FIG. 1.

In addition, FIG. 2 shows that an auxiliary unit drive can also be connected directly to the electrical machine 76 by means of the gear 77, for example in a commercial vehicle. The auxiliary unit drive is also referred to as a PTO, the letters PTO standing for power take-off. The configuration shown in FIG. 2 enables the auxiliary unit drive PTO to be operated when the hybrid vehicle is stationary, by means of the electrical machine 76, or by means of the primary drive 43, or by means of both branches together. The auxiliary unit drive can be a hydraulic pump or a compressor, for example.

In the dual-range CVT version, the direct drive stage 30; 70 can be designed so that it serves simultaneously as a switching stage between the two CVT driving ranges, high and low. Furthermore, the direct drive stage 30; 70 together with the electrical machine 36; 76 operating as an electric motor, can also serve as a direct drive stage, as seen in FIG. 3.

Figure 3:
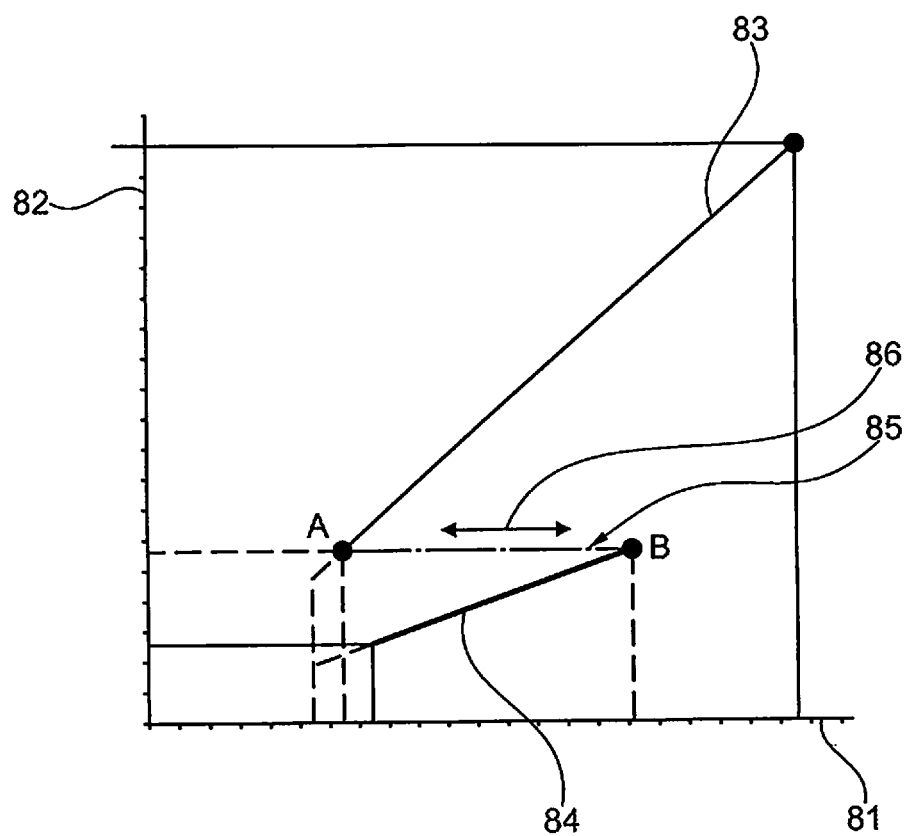
FIG. 3 shows a transmission ratio characteristic map of the CVT drive train according to an exemplary embodiment of a method according to the present invention.

FIG. 3 shows a transmission ratio characteristic map for the CVT drive trains 1; 41 of FIGS. 1 and 2, and in the form of a Cartesian coordinate diagram. The coordinate diagram shown in FIG. 3 includes an x-axis 81 and a y-axis 82. A variable variator transmission ratio is represented by the x-axis 81. A transmission ratio of the sub-transmission is represented by the y-axis 82.

A characteristic curve 83 represents the low operating range. A characteristic curve 84 represents the high operating range. A dash-dotted line 85 that runs parallel to the x-axis 81 represents a switchover option between a point A on the low range curve 83 and a point B on the high range curve 84. The switchover between points A and B is indicated by a double-headed arrow 86.

The transmission ratio of the direct drive stage 30; 70 is advantageously chosen here to result in a favorable division of the two CVT operating ranges, or driving ranges low and high. In addition, the transmission ratio is preferably chosen so that the hybrid vehicle can be driven at optimal efficiency using the electrical machine 36; 76 alone.

When starting to drive the hybrid vehicle under full load, the electrical machine 36; 76 can be operated using the CVT variator reduction and without a direct gear. When used as a passenger car transmission, the total drive train transmission ratio of the switching stage and simultaneous electric motor direct stage lies in a range between four and seven, preferably between five and six.

During the process of switching over between the operating ranges of a dual-range CVT with the aid of the direct stage, an unwanted interruption of propulsive power can also be reduced or eliminated using the electrical machine 36; 76. For that electrically supported switchover process, advantageously not so many clutch actuations are needed, in comparison to a mechanically supported switchover process using the internal combustion engine. That also enables the switchover process to be carried out more quickly.

What is claimed is:

1. A CVT drive train, said drive train comprising:
a primary drive source,
a continuously adjustable variator having a variator input and a variator output, and operatively connected to the primary drive source and to a transmission input shaft,
a start-up device including a startup clutch connected between the primary drive source and the variator,
a secondary drive source disposed coaxially with the transmission input shaft and arranged between the primary drive source and the variator,
a first additional clutch for coupling the secondary drive source to a direct drive stage,
a second additional clutch for coupling the secondary drive source to a variator input,
a third additional clutch is positioned on an output side, connected to the variator output, and configured to selectively decouple the variator on the output side, and
a sub-transmission connected to the variator output and including:
a planetary gear set, and
a shifting apparatus for switching between a first range low and a second range high at the variator output.

2. A CVT drive train according to claim 1, wherein the first and second additional clutches are situated upstream of the variator input.

3. A CVT drive train according to claim 1, wherein the first and second additional clutches are positive-lock clutches.

4. A CVT drive train according to claim 1, wherein the start-up device is positioned on a primary drive side between the second additional clutch and a torsional vibration damper.

5. A CVT drive train according to claim 1, wherein the second additional clutch is positioned radially inside the secondary drive source.

6. A CVT drive train according to claim 1, wherein the secondary drive source is coupled directly to an auxiliary power takeoff.

7. A method for operating a CVT drive train having the components claimed in claim 1, said method comprising the steps of:
a. providing propulsive power to an output drive from the primary drive source through the variator with the variator operating in a first variator operating range,
b. adjusting the variator to operate in a second operating range different from the first operating range, and
c. disconnecting the primary power source from the drive train and providing propulsive power to the output drive through the variator from the secondary power source.

8. A method according to claim 7, including the step of utilizing the secondary drive source for propulsion during a direct drive stage shift when changing over between different operating ranges of a multi-range variator to avoid an unwanted interruption of propulsive power.

9. A CVT drive train according to claim 1 wherein the planetary gear set comprises:
a sun gear rotatably fixed to variator output;
a ring gear rotatably fixed to the third additional clutch and the shifting apparatus; and,
a planet carrier rotatably fixed to the direct drive stage.

10. The CVT drive train according to claim 9 wherein the shifting apparatus is arranged to brake the ring gear.

11. The CVT drive train according to claim 9 wherein the third additional clutch is arranged to rotably fix the ring gear to the direct drive stage.

* * * * *